United States Patent [19]
Mäkitalo et al.

[11] Patent Number: 5,561,850
[45] Date of Patent: Oct. 1, 1996

[54] METHOD AND ARRANGEMENT FOR REDUCING FADING BETWEEN A BASE STATION AND MOBILE UNITS

[75] Inventors: Östen Mäkitalo, Uttran; Bo Olsson, Haninge, both of Sweden

[73] Assignee: Televerket, Farsta, Sweden

[21] Appl. No.: 46,798

[22] Filed: Apr. 16, 1993

[30] Foreign Application Priority Data

Apr. 29, 1992 [SE] Sweden .................................. 9201339

[51] Int. Cl.$^6$ ............................ H04B 7/06; H04B 15/02
[52] U.S. Cl. ...................... 455/52.3; 455/33.3; 455/65
[58] Field of Search .................................. 455/33.1, 33.3, 455/33.4, 54.1, 52.1, 52.3, 278.1, 62, 63, 65, 276.1, 279.1; 343/761, 834, 833, 832, 837

[56] References Cited

U.S. PATENT DOCUMENTS

| | | | |
|---|---|---|---|
| 1,860,123 | 5/1932 | Yagi | 343/837 |
| 3,790,943 | 2/1974 | Pickles et al. | 343/833 |
| 4,123,759 | 10/1978 | Hines et al. | 343/832 |
| 4,394,779 | 7/1983 | Hansen | 455/278.1 |
| 5,138,327 | 8/1992 | Chang et al. | 455/33.3 |
| 5,212,689 | 5/1993 | Eriksson | 455/52.3 |

Primary Examiner—Reinhard J. Eisenzopf
Assistant Examiner—Thanh Le
Attorney, Agent, or Firm—Oblon, Spivak, McClelland, Maier, & Neustadt, P.C.

[57] ABSTRACT

The invention relates to a method and an arrangement for improving the communication between a base station and a number of mobile units belonging to it in a microcell system. In greater detail, the invention has the aim of reducing the fading which is a problem when the mobile units are moving slowly or are standing still. According to the invention, the problem is solved by introducing diversity on the downlink in the system. The antenna pattern of the base station is turned so that a wave pattern varying with time is produced with spatially separated fading points. The communication preferably utilizes time-division multiple access (TDMA), the turning of the antenna pattern being effected step by step between suitable time slots, preferably between TDMA frames. The turning of the antenna pattern is advantageously produced by controlling a sectoral antenna (7, 7'). In a preferred embodiment, the directional antenna (7') comprises an active element (10') in the form of a half-wave dipole surrounded by a dielectric (11) which, in turn, is enclosed in a cylinder which is made up of a number of passive elements (9') insulated from one another. The turning of the antenna pattern of the directional antenna is produced by electrically switching the passive elements.

6 Claims, 1 Drawing Sheet

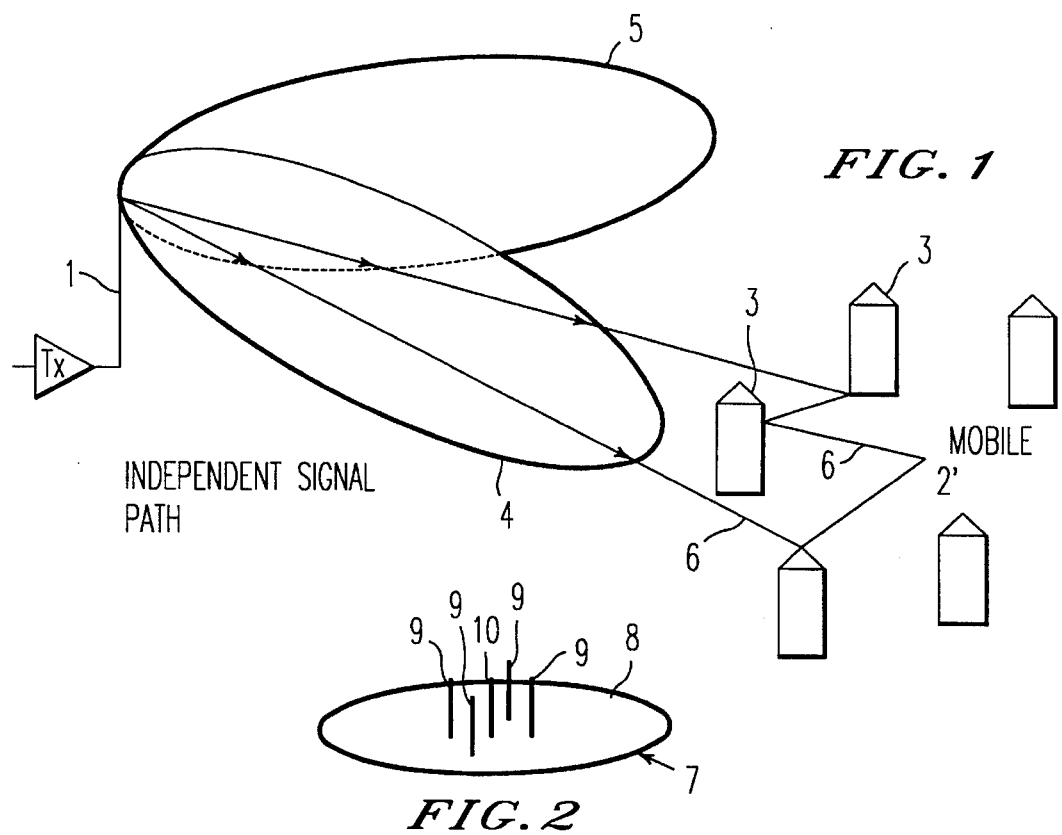
FIG. 1
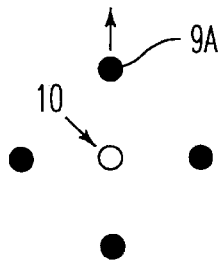
FIG. 2
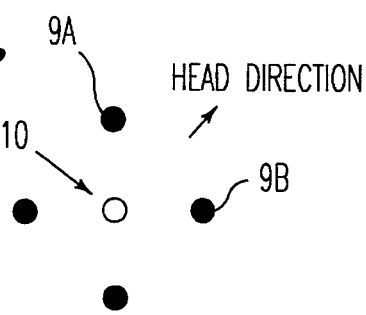
FIG. 3A
FIG. 3B
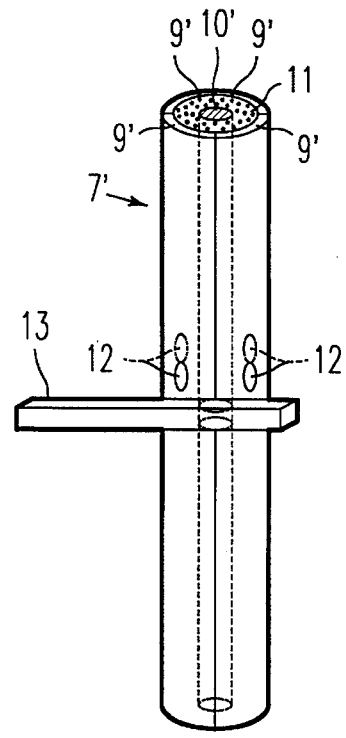
FIG. 4

METHOD AND ARRANGEMENT FOR REDUCING FADING BETWEEN A BASE STATION AND MOBILE UNITS

FIELD OF THE INVENTION

The present invention relates to a method and an arrangement for improving the communication between a base station and a number of mobile units belonging to it in a microcell system. The invention has the special aim of reducing the fading which is a problem when the mobile units are moving slowly and are standing still.

PRIOR ART

In the field of radio communication, the fading phenomenon is known, which means that the signal strength drops severely on occasion due to the fact that the sum of the signals which reach the receiver antenna becomes zero. This is because, in a connection between a base station and mobile units, a wave pattern arises due to multipath propagation. The wave pattern depends on the environment in which the mobile is located. The wave pattern is affected by houses, towers, trees, mountains and so forth, so that certain points in this pattern can be blacked-out to a greater or lesser extent. The said points are called minimum points hereinafter. When a mobile unit is moving in the vicinity of such a point, or is standing still at such a point, a break occurs in the communication. In systems which are characterised by slow moving mobile units or stationary units, this problem can become troublesome. At moderate to high speeds, the short breaks, with burst errors, which occur in the radio channel through fading can be overcome by coding and interleaving, and the disturbance in the communication is moderate. When a mobile unit is standing still at a minimum point, for example at road crossings, a queue in traffic etc., the break will then have a duration which is not acceptable.

To solve the problems of disturbances in the communication due to passage through minimum points, it is known per se to utilise so-called interleaving. This is effective down to a certain speed but below this speed other measures must be taken. It has previously been known to utilise so-called frequency hopping, which means that the mobile jumps between different frequencies. This probably provides a solution for the problem since the frequencies are assumed to have their minimum points at different places.

Frequency hopping is effective in a system with access to a large number of frequencies. This method is not suitable in a system with few frequencies.

It is also known to use antenna diversity at the receiver end of the base station, that is to say on the uplink. However, it has not previously been known to use diversity on the downlink.

SUMMARY OF THE INVENTION

According to the invention, the problem with fading between a base station and mobile units in a mobile microcell system is solved by introducing diversity on the downlink in the system. The invention provides a method in which the antenna pattern of the base station is turned so that a wave pattern varying with time is produced with spatially different fading points.

The invention is preferably applied in a digital communication system which utilises time-division multiple access (TDMA). The antenna pattern is then turned step by step between suitable time slots, preferably between frames in the signalling.

The invention also provides an arrangement for carrying out the method. According to the invention, the base station comprises a directional antenna for generating, by turning the directional pattern of the antenna, a wave pattern varying with time and having spatially different fading points.

Further embodiments of the invention are specified within subsequent patent claims.

BRIEF DESCRIPTION OF THE DRAWINGS

The invention will now be described in detail with reference to the attached drawings, in which:

FIG. 1 illustrates the principle of multipath propagation;

FIG. 2 shows a directional antenna with a ground plane according to the invention;

FIGS. 3A and B illustrate the operation of the directional antenna; and

FIG. 4 shows a preferred embodiment of the directional antenna according to the invention.

DETAILED DESCRIPTION OF THE INVENTION

As mentioned earlier, fading in radio communication systems arises through multipath propagation. FIG. 1 is a simplified illustration of how fading can arise. The system comprises a base with antenna 1 and mobiles 2, one of which is drawn. The environment 3 is symbolised by a number of houses. Between the base and the mobile, the radio signal can take a number of different paths 6, two of which are drawn. The signal strength at the mobile is a sum of the signals which have a certain phase difference due to the different paths. This means that the signals can cancel one another out at certain points.

With a directional antenna, the directional pattern of the antenna can be changed. In FIG. 1, two possible patterns are shown as two lobes 4 and 5. As can be seen in the figure, the two lobes have different amplitudes in the two directions along the signal paths 6 to the mobile. The first lobe 4 has relatively strong amplitudes which is shown by the long arrows, while the second lobe 5, which is shown extended behind the first lobe, has relatively small amplitudes along the same paths. The relationship between the amplitude is different for the first and the second lobe. This means that if there is strong fading in the one lobe, there is usually less fading in the second lobe. In other words, the first lobe gives rise to a wave propagation pattern with certain minimum points whilst the second lobe gives a pattern with other, different, minimum points. It is this knowledge which is utilised in the present invention.

In current mobile telephone systems the fading problem is overcome when the mobile is moving at moderate to high speeds. The mobile then passes through the minimum point relatively quickly and error-correcting codes overcome the short breaks which arise. If the mobile is moving slowly or is standing still at a minimum point, however, problems arise.

The problem can be solved by turning the directional pattern of the antenna continuously or step by step. The result is then a varying pattern of wave shapes with minimum points at varying locations. In this way the risk is minimised that the signal disappears completely at a point, since the location is probably not a minimum point for all directions of the antenna. In digital mobile telephone systems, the coding and the interleaving overcome the short breaks which may still arise.

In a preferred embodiment, the invention is applied in a digital mobile telephone system with time-division multiple access (TDMA). GSM is one example of such a digital mobile telephone system.

The signalling is divided into frames which consist of normally eight time slots. A message is normally divided up and transmitted in the same time slot in a number of frames, normally eight, in certain cases four or in one case even 19 frames (interleaving). Each mobile receives and transmits in every eighth time slot. Up to eight messages can thus be submitted at the same time. Transmitting and receiving is effected in bursts of messages. There is a pause of three time slots between the bursts. The error-correcting code which is used in GSM provides that one or two bursts can normally be lost without losing the message.

According to the invention, the antenna changes direction between each frame which consists of eight time slots. According to a preferred embodiment of a directional antenna, there are eight possible directions. Since switching-over can be done very quickly, this can occur between any desired time slots. At sensitive points, that is to say a minimum point in one of the directions, each eighth frame can be lost without problems.

According to the invention, the directional diversity of the antenna is produced by controlling a directional antenna. Different sectoral antennas have previously been known.

FIG. 2 shows such a sectoral antenna 7. It comprises a ground plane 8 and passive elements 9 in the form of quarter-wave rods. In the centre, there is an active element 10 which is connected to the receiver/transmitter. The passive elements 9 are coupled to the ground plane with the aid of electronic circuits or are insulated from it. The grounded elements act as directors while insulated elements act as reflectors.

In FIG. 3A, a passive element 9A is grounded whilst the other ones are insulated. The main direction of the antenna is shown by the arrow. In FIG. 3B, two passive elements 9A and 9B are grounded while the other two are insulated, which provides another main direction as shown by the arrow. By combining the four directions in FIG. 3A with the four in 3B, eight possible directions with 45° between them are obtained. (The antenna can also be made omni-directional by insulating or grounding all the passive elements).

The distance from the active element in the centre to the passive elements should correspond to a quarter wavelength. By utilising a material with a high dielectric constant, for example a cermet, the size of the antenna can be reduced.

A preferred embodiment thereof is shown in FIG. 4. The antenna 7' comprises an active element 10' in the form of a half-wave dipole. The active element 10' is surrounded by a dielectric 11 with a high dielectric number $\epsilon_r$, preferably within the range 100–200. The dielectric 11 is enclosed in a cylinder which consists of four passive elements 9' in the form of cylinder sectors insulated from one another. Each passive element 9' is provided with a PIN diode switch 12 which opens and closes a contact to the ground rail (not shown). A hollow metal support 13 contains cabling to the PIN diode switches and an antenna cable to the active dipole element 10' via a matching transformer (not shown). The antenna 7' works in the same way as the antenna above. By insulating two elements located adjacently in pairs (directors) and grounding two elements located adjacently in pairs (reflectors), a directional antenna is obtained with the main direction towards the directors. By insulating one element (director) and grounding the other three elements (reflectors), a directional antenna is obtained with the main direction towards the director. Each of the above methods provides four main directions in each case, displaced in 90° steps. In total, this provides light possible adjustment directions in 45° steps. In an environment with reflecting surfaces relatively close to the transmitter antenna, for example a microcell, even such a small change as 45° can provide an adequate gain in signal strength at a minimum point. It should be noted that there can be many signal paths and that it is the sum of these, added with the phase angles at the receiver antenna of the mobile telephone, which is the received signal.

We claim:

1. A sending antenna system for reducing fading in a mobile telephone communication system, comprising:

an active emitting element placed on a ground plane;

a plurality of passive elements placed in a pattern around said active emitting element on said ground plane;

an electronic circuit to selectively connect said passive elements to said ground plane in a sequence, causing a sending direction of the antenna system to change among eight different directions between each frame wherein each frame consists of eight time slots, so as to have spatially separate fading points.

2. A system as in claim 1 wherein:

said active element is employed as an antenna in a time-division multiple access system; and said selective activation occurs between time slots of the time-divided signal provided to said active element.

3. A system as in claim 1 wherein said active element comprises:

a half-wave dipole.

4. A system as in claim 1 wherein said active element and said passive elements are enclosed within a cylinder and are insulated from each by a dielectric material.

5. A system as in claim 4 wherein said dielectric material has a dielectric number $\epsilon_x$ of between 100–200.

6. A system as in claims 1, 2, 3, 4 or 5 wherein the number of passive elements is four.

* * * * *